US011100734B2

(12) United States Patent
Ahn et al.

(10) Patent No.: US 11,100,734 B2
(45) Date of Patent: Aug. 24, 2021

(54) ELECTRONIC DEVICE PERFORMING OPERATIONS BASED ON MOVEMENT DIRECTION OF EXTERNAL ELECTRONIC DEVICE AND METHOD THEREFOR

(71) Applicant: Samsung Electronics Co., Ltd., Gyeonggi-do (KR)

(72) Inventors: Jungho Ahn, Gyeonggi-do (KR); Saegee Oh, Gyeonggi-do (KR); Chulkwi Kim, Gyeonggi-do (KR); Yongjun Son, Gyeonggi-do (KR); Jun Yoo, Gyeonggi-do (KR); Jaeil Joo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/527,375

(22) Filed: Jul. 31, 2019

(65) Prior Publication Data

US 2020/0058181 A1    Feb. 20, 2020

(30) Foreign Application Priority Data

Aug. 16, 2018  (KR) ........................ 10-2018-0095624

(51) Int. Cl.
*G07C 9/00*    (2020.01)
*G06K 7/10*    (2006.01)
(Continued)

(52) U.S. Cl.
CPC ..... *G07C 9/00309* (2013.01); *G06K 7/10009* (2013.01); *G06K 19/0723* (2013.01); *G07C 9/20* (2020.01); *G07C 2009/0038* (2013.01)

(58) Field of Classification Search
CPC ....................................................... G07C 9/00
See application file for complete search history.

(56) References Cited

U.S. PATENT DOCUMENTS

| 7,142,090 B2 * | 11/2006 | Ueda ........................ B60R 25/24 |
| | | 340/5.61 |
| 7,388,466 B2 * | 6/2008 | Ghabra ................... E05B 81/78 |
| | | 340/5.61 |

(Continued)

FOREIGN PATENT DOCUMENTS

| EP | 2 894 610 A1 | 7/2015 |
| EP | 3 147 868 A1 | 3/2017 |

(Continued)

OTHER PUBLICATIONS

International Search Report dated Oct. 31, 2019.
European Search Report dated Jul. 1, 2021.

*Primary Examiner* — K. Wong
(74) *Attorney, Agent, or Firm* — Cha & Reiter, LLC.

(57) ABSTRACT

Provided are an electronic device and an operation method thereof. The electronic device may include: first and second antennas to receive a signal output by an external electronic device; a communication circuit configured to control the first antenna and the second antenna; and a processor. The processor may be configured to: receive the signal through the first antenna and the second antenna; measure a first distance between the first antenna and the external electronic device using the signal received by the first antenna; measure a second distance between the second antenna and the external electronic device using the signal received by the second antenna; determine a movement direction of the external electronic device based on a change in a difference between the first distance and the second distance; and perform a preset operation corresponding to the movement direction of the external electronic device. Other embodiments are also possible.

20 Claims, 16 Drawing Sheets

(51) Int. Cl.
*G06K 19/07* (2006.01)
*G07C 9/20* (2020.01)

(56) References Cited

U.S. PATENT DOCUMENTS

| | | | |
|---|---|---|---|
| 9,367,977 B2 * | 6/2016 | Lee | G07C 9/00309 |
| 9,685,014 B1 * | 6/2017 | Ghabra | H04W 4/80 |
| 9,894,613 B2 | 2/2018 | Scheim et al. | |
| 10,270,642 B2 * | 4/2019 | Zhang | H04L 27/362 |
| 10,328,900 B1 * | 6/2019 | Yakovenko | B60R 25/24 |
| 10,573,173 B2 * | 2/2020 | Liu | G06K 9/00832 |
| 2008/0092443 A1 | 4/2008 | Herman et al. | |
| 2013/0237193 A1 | 9/2013 | Dumas et al. | |
| 2015/0130588 A1 | 5/2015 | Lee | |
| 2015/0199889 A1 | 7/2015 | Ghose et al. | |
| 2016/0001742 A1 | 1/2016 | Miyazawa et al. | |
| 2016/0240023 A1 | 8/2016 | Toivonen et al. | |
| 2017/0118323 A1 | 4/2017 | Kim et al. | |
| 2018/0183650 A1 * | 6/2018 | Zhang | G01S 13/003 |
| 2018/0244385 A1 | 8/2018 | Kim et al. | |

FOREIGN PATENT DOCUMENTS

| | | |
|---|---|---|
| JP | 6-144757 | 5/1994 |
| JP | 6-144767 A | 5/1994 |
| JP | 2016-178517 A | 10/2016 |
| JP | 2016-178617 A | 10/2016 |
| KR | 10-2010-0033624 A | 3/2010 |
| KR | 10-1105009 B1 | 1/2012 |
| KR | 10-1131182 B1 | 3/2012 |
| KR | 10-2014-0080170 A | 6/2014 |
| KR | 10-1459967 B1 | 11/2014 |
| KR | 10-1626716 B1 | 6/2016 |
| KR | 10-2016-0136131 A | 11/2016 |
| KR | 10-2017-0022489 A | 3/2017 |
| WO | 2009/143415 A1 | 11/2009 |

* cited by examiner

FIG. 2

PROGRAM 200, 146

APPLICATIONS
- HOME 251
- DIALER 253
- SMS/MMS 255
- IM 257
- BROWSER 259
- CAMERA 261
- ALARM 263
- CONTACT 265
- VOICE RECOGNITION 267
- EMAIL 269
- CALENDAR 271
- MEDIA PLAYER 273
- ALBUM 275
- WATCH 277
- HEALTH 279
- ENVIRONMENT INFORMATION 281

MIDDLEWARE 144, 203
- APPLICATION MANAGER 201
- WINDOW MANAGER 213
- MULTIMEDIA MANAGER 215
- RESOURCE MANAGER 207
- POWER MANAGER 209
- DATABASE MANAGER 211
- PACKAGE MANAGER 223
- CONNECTIVITY MANAGER 225
- NOTIFICATION MANAGER 217
- LOCATION MANAGER 219
- GRAPHIC MANAGER 221
- SECURITY MANAGER
- TELEPHONY MANAGER 205
- VOICE RECOGNITION MANAGER 227

OPERATING SYSTEM 142

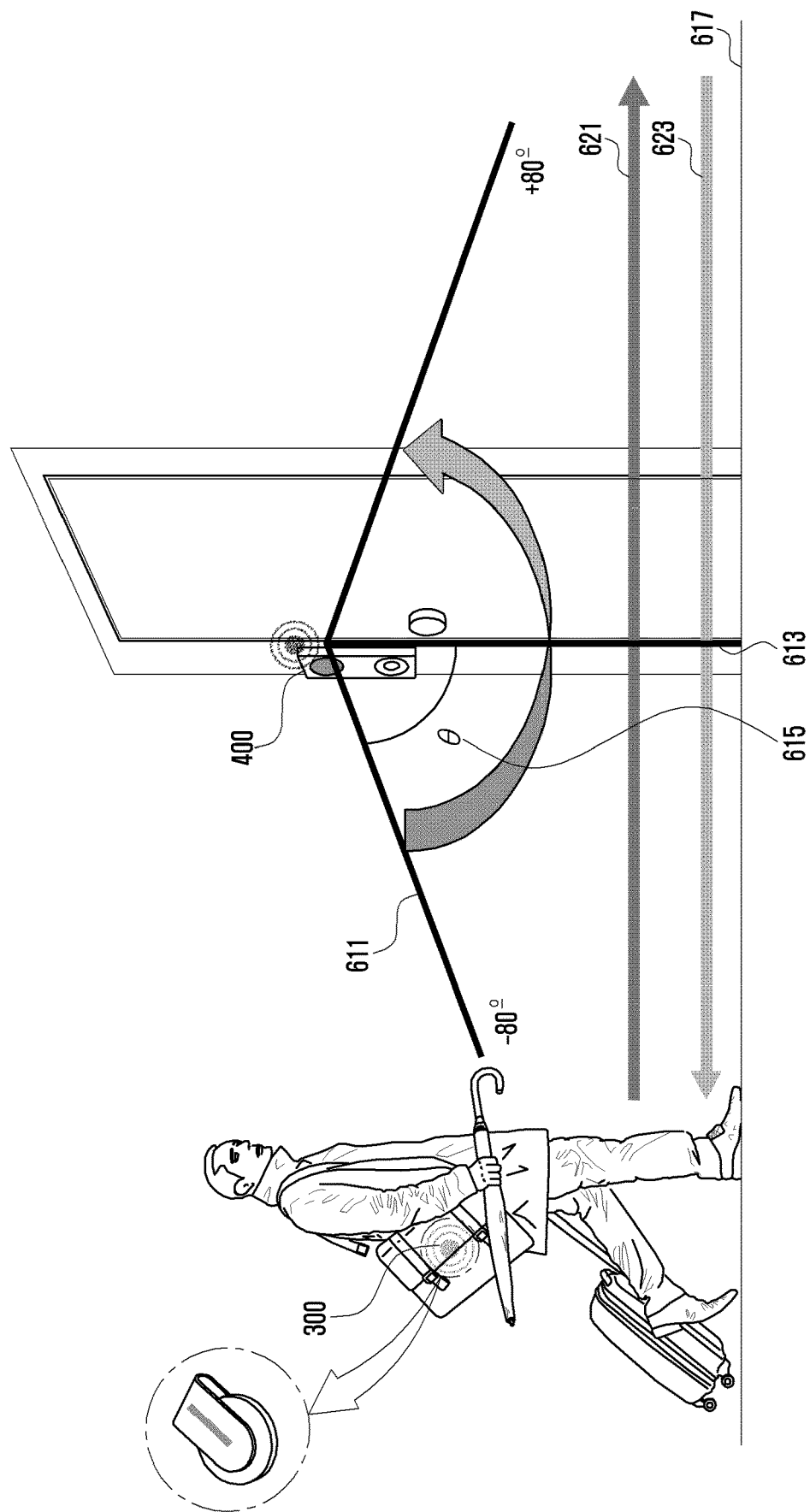

$$\sin \theta = \frac{p}{d}$$

$$\theta = \sin^{-1}\left(\frac{p}{d'}\right)$$

XY plane

ELECTRONIC DEVICE PERFORMING OPERATIONS BASED ON MOVEMENT DIRECTION OF EXTERNAL ELECTRONIC DEVICE AND METHOD THEREFOR

CROSS-REFERENCE TO RELATED APPLICATION(S)

This application is based on and claims priority under 35 U.S.C. § 119 to Korean Patent Application No. 10-2018-0095624, filed on Aug. 16, 2018, in the Korean Intellectual Property Office, the disclosure of which is incorporated by reference herein in its entirety.

BACKGROUND

1. Field

Certain embodiments of the disclosure relate to an electronic device that performs operations based on the movement direction of an external electronic device and an operation method thereof.

2. Technical Field

With the spread of various electronic devices such as smartphones, tablet personal computers (PC), portable multimedia players (PMP), personal digital assistants (PDA), laptop PCs, and wearable devices, there is an increasing interest in peripheral devices that are interoperable with these various electronic devices.

In addition, with an increasing interest in Internet of things (IoT) technology, IoT technology has been increasingly applied to various peripheral devices. In particular, IoT technology can be applied to an electronic device that opens and closes a door in a home. Such a device may be able to detect intruders into that home.

The existing electronic device that opens and closes the door can detect whether the door is opened by checking whether magnets attached respectively to the door and the door frame are in contact. With this technology, it is not possible to determine whether a user (occupant of the home) has left the room or house (also known as check-out) or has entered the room or house (also known as check-in).

And because it cannot be determined whether the user has entered or exited the room, IoT appliances placed in the room cannot be operated based on the presence of the user.

SUMMARY

The disclosure has been made in view of the above problems. Accordingly, in one or more embodiments disclosed herein, there is provided an electronic device that can perform operations based on the movement direction of an external electronic device and an operation method thereof.

Additional aspects will be set forth in part in the description which follows and, in part, will be apparent from the description, or may be learned by practice of the presented embodiments.

According to an embodiment of the disclosure, there is provided an electronic device. The electronic device may include: a first antenna and a second antenna to receive a signal output by an external electronic device; a communication circuit configured to control the first antenna and the second antenna; and a processor. The processor may be configured to: receive the signal through the first antenna and the second antenna; measure a first distance between the first antenna and the external electronic device using the signal received by the first antenna; measure a second distance between the second antenna and the external electronic device using the signal received by the second antenna; determine a movement direction of the external electronic device based on a change in a difference between the first distance and the second distance; and perform a preset operation corresponding to the movement direction of the external electronic device.

According to an embodiment of the disclosure, there is provided an operation method for an electronic device. The operation method may include: receiving a signal output by an external electronic device via a first antenna and a second antenna; determining a first distance between the first antenna and the external electronic device based on the signal received via the first antenna; determining a second distance between the second antenna and the external electronic device based on the signal received via the second antenna; determining a movement direction of the external electronic device based on a change in a difference between the first distance and the second distance; and performing a preset operation corresponding to the movement direction of the external electronic device.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a diagram of programs running on the electronic device according to an embodiment of the disclosure.

FIG. 6A is a view illustrating an example in which the electronic device determines the direction of movement of the external electronic device based on changes in the angle of the movement of the external electronic device according to an embodiment of the disclosure.

DETAILED DESCRIPTION

Figure 1:
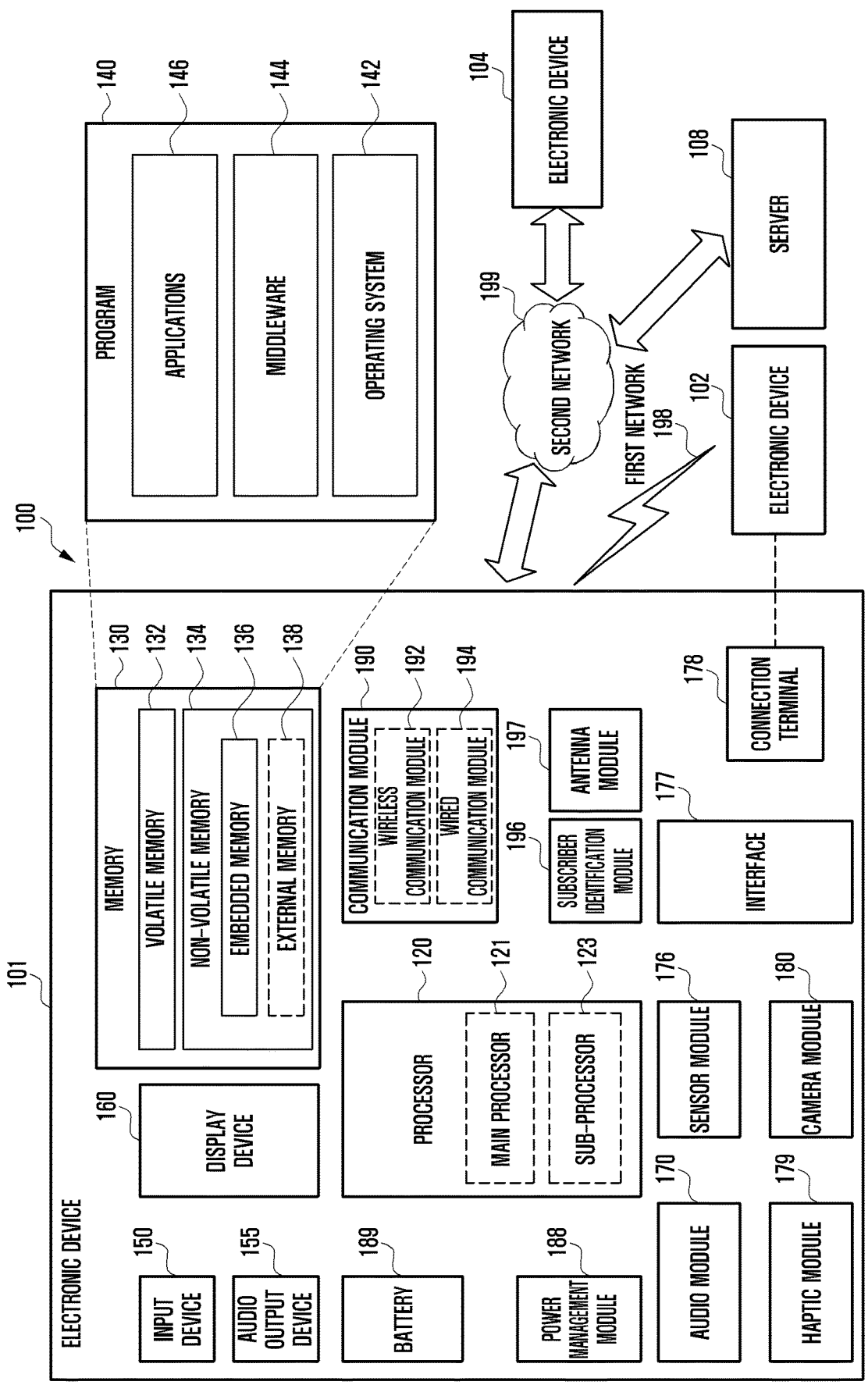
FIG. 1 is a block diagram of an electronic device according to an embodiment of the disclosure.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

FIG. 2 is a block diagram 200 illustrating the program 140 according to an embodiment. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
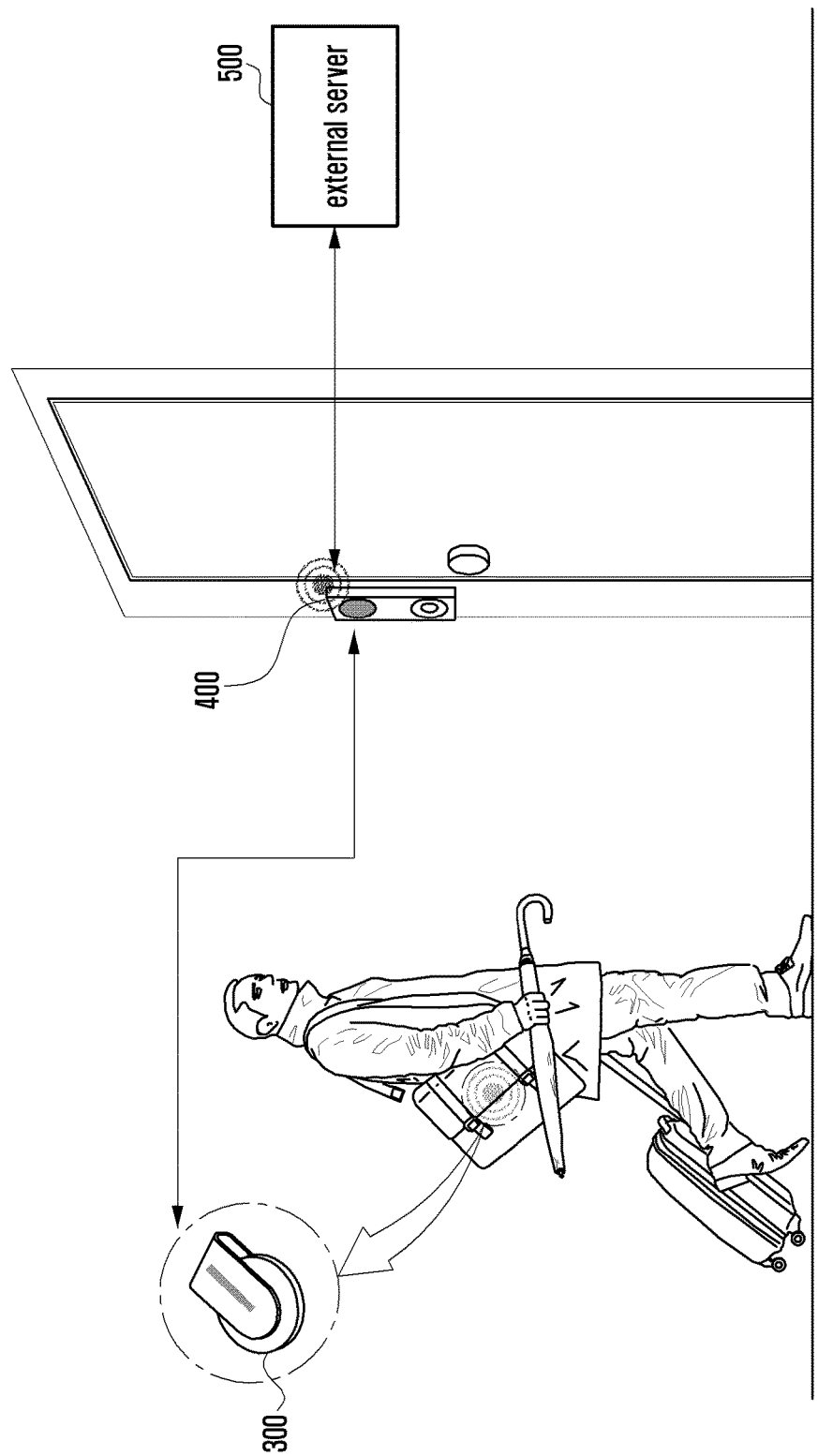
FIG. 3 is a view illustrating an external electronic device, an electronic device, and an external server according to an embodiment of the disclosure.

FIG. 3 is a view illustrating an external electronic device, an electronic device, and an external server according to an embodiment of the disclosure.

With reference to FIG. 3, the system according to an embodiment of the disclosure may include an external electronic device 300, an electronic device 400, and an external server 500.

In one embodiment, the system can identify the movement direction of the user carrying the external electronic device 300 and can perform various operations according to the movement direction of the user, such as opening and closing the door, sending a message indicating the user's entry or exit, and controlling various home appliances (e.g., refrigerator, air conditioner, television, and light) arranged within the space where the system is installed (e.g. inside the room corresponding to the door).

In one embodiment, the electronic device 400 may communicate with the external electronic device 300 to track the distance between the external electronic device 300 and the electronic device 400 and the movement direction of the external electronic device 300. The electronic device 400 may perform a preset operation corresponding to the movement direction of the external electronic device 300.

In one embodiment, the electronic device 400 can transmit and receive data with the external electronic device 300 using various communication schemes and identify the position of the external electronic device 300. For example, the electronic device 400 may transmit and receive data to and from the external electronic device 300 through ultra-wideband (UWB) communication using a frequency band of several GHz and identify the position of the external electronic device 300. Using ultra-wideband communication, the position of the external electronic device 300 may be determined with an error range of several centimeters. Accordingly, the position detection accuracy of UWB communication may be high.

In one embodiment, the external electronic device 300 can transmit and receive data to and from the electronic device 400 by using various communication schemes. To help the electronic device 400 identify the position of the external electronic device 300, the external electronic device 300 may periodically transmit a signal for positioning to the electronic device 400. When the user of the system carrying the external electronic device 300 moves, information regarding the movement of the user can be obtained by the electronic device 400 or the external server 500 based on the movement of the external electronic device 300.

In one embodiment, the electronic device 400 may authenticate the external electronic device 300 based on data transmitted by the external electronic device 300, and may perform various operations including opening and closing the door based on the authentication result of the external electronic device 300.

In one embodiment, the electronic device 400 may perform various operations based on the movement direction of the external electronic device 300. For example, the electronic device 400 may perform a series of operations to change the operation mode of other external electronic devices (not shown) arranged in the area where the electronic device 400 is installed (e.g. inside the room where the door is installed).

In one embodiment, the external server 500 may receive movement information of the external electronic device 300 from the electronic device 400. Based on the movement information of the external electronic device 300, the external server 500 can control another external electronic device (e.g., home appliance or motion detection sensor) disposed in the room or house where the electronic device 400 is installed. For example, the external server 500 may deactivate the motion detection sensor when the external electronic device 300 is moved from the outside of the room and into the room (e.g. the user has checked into the room). The external server 500 may activate the motion detection sensor when the external electronic device 300 is moved from inside the room to the outside (e.g. the user has checked out of the room).

In one embodiment, based on the authentication result of the external electronic device 300, the external server 500 may control another external electronic device (e.g., home appliance or motion detection sensor) disposed in the room or house where the electronic device 400 is installed.

Next, a description is given of how the electronic device 400 determines the movement direction of the external electronic device 300 and the distance between the external electronic device 300 and the electronic device 400.

Figure 4:
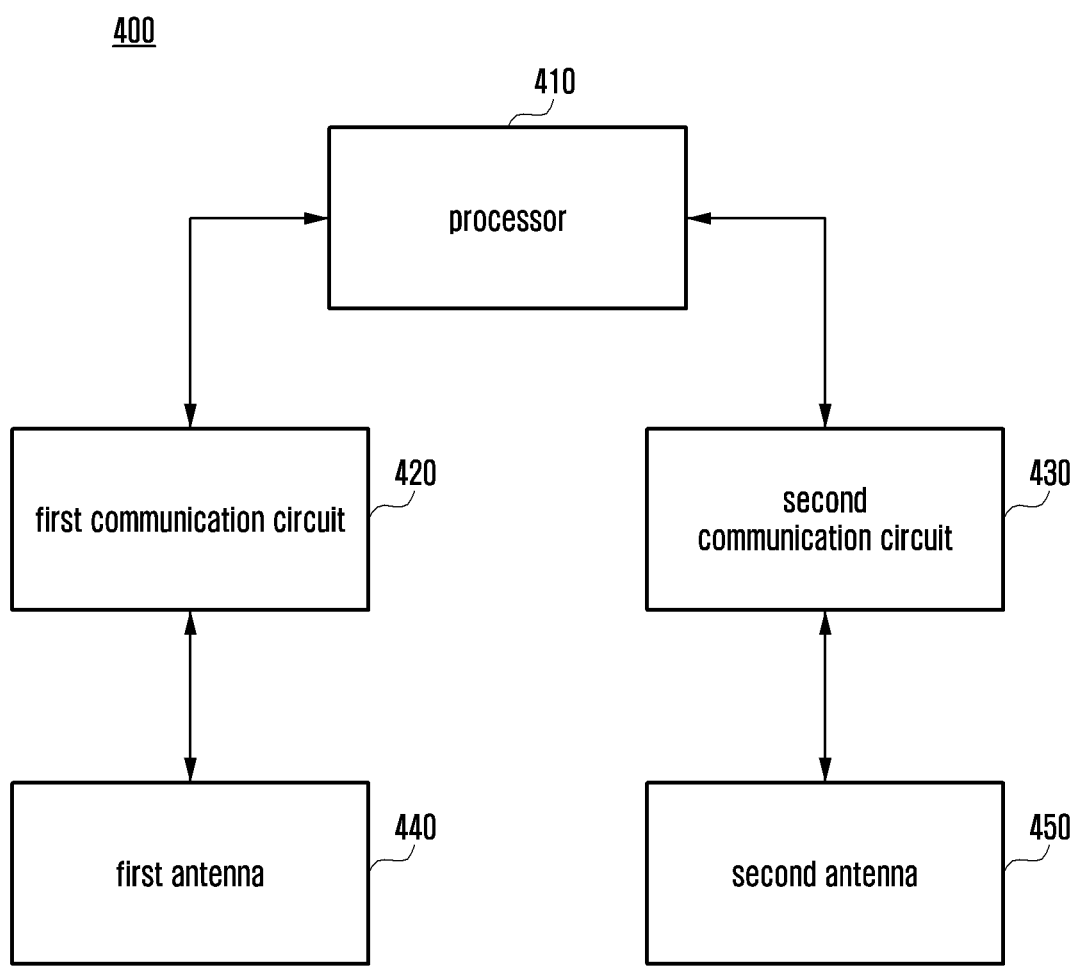
FIG. 4 is a block diagram of an electronic device according to various embodiments of the disclosure.

FIG. 4 is a block diagram of an electronic device according to an embodiment of the disclosure.

With reference to FIG. 4, in one embodiment, the electronic device 400 may include a processor 410, a first communication circuit 420, a second communication circuit 430, a first antenna 440, and a second antenna 450.

In one embodiment, the first antenna 440 and the second antenna 450 can transmit and receive data to and from an external electronic device (e.g., external electronic device 300 in FIG. 3) through ultra-wideband (UWB) communication using a frequency band of several GHz. The first antenna 440 and the second antenna 450 may receive a signal for position measurement transmitted by the external electronic device 300.

In one embodiment, the first antenna 440 may be electrically connected to the first communication circuit 420 and may transmit a signal to the external electronic device 300 under the control of the first communication circuit 420. The second antenna 450 may be electrically connected to the second communication circuit 430 and may transmit a signal to the external electronic device 300 under the control of the second communication circuit 430.

In one embodiment, the first communication circuit 420 and the second communication circuit 430 may be implemented as a single communication circuit.

In one embodiment, the processor 410 may receive a signal output by the external electronic device 300 through the first antenna 440. The processor 410 may determine the first distance between the first antenna 440 and the external electronic device 300 by using the signal output by the external electronic device 300. The processor 410 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

In one embodiment, the processor 410 may receive a signal output by the external electronic device 300 through the second antenna 450. The processor 410 may determine the second distance between the second antenna 450 and the external electronic device 300 by using the signal output by the external electronic device 300.

In one embodiment, the signals received by the first antenna 440 and the second antenna 450 may be the same. The signal received by the first antenna 440 and the second antenna 450 may include a time stamp. The time stamp may include information on the time when the external electronic device 300 transmitted the signal.

In one embodiment, the processor 410 may identify the difference between the time at which the signal is received via the first antenna 440 and the time indicated by the time stamp, which indicates when the signal was emitted by the external electronic device 300. The processor 410 may determine the first distance between the first antenna 440 and the external electronic device 300 based on the speed of the signal (i.e. the speed of light at $c=3*10\text{-}8$ m/s) and the time difference.

In one embodiment, the processor 410 may identify the difference between the time at which the signal is received via the second antenna 450 and the time indicated by the time stamp. The processor 410 may determine the second distance between the second antenna 450 and the external electronic device 300 based on the speed of the signal (c=3*10-8 m/s) and the time difference.

In one embodiment, the processor 410 may identify the difference between the first distance and the second distance. The processor 410 may track change in the difference to determine the movement direction of the external electronic device 300 or the position of the external electronic device 300. For example, if the value obtained by subtracting the second distance from the first distance decreases, the processor 410 may determine that the external electronic device 300 is being moved in a direction closer to the second antenna 450 from the first antenna 440. As another example, if the value obtained by subtracting the second distance from the first distance increases, the processor 410 may determine that the external electronic device 300 is being moved in a direction closer to the first antenna 440 from the second antenna 450.

In one embodiment, the processor 410 may track change in the angle in the movement of the external electronic device 300 based on the difference between the first distance and the second distance, and may determine the movement direction of the external electronic device 300 based on the change in the angle. Here, the angle may mean the angle between an imaginary line connecting the external electronic device 300 and the electronic device 400 and a preset reference line (e.g., a line connecting the electronic device 400 and the ground surface). The processor 410 may determine the movement direction of the external electronic device 300 based on the distance between the external electronic device 300 and the electronic device 400 and the change in angle due to movement of the external electronic device 300.

In one embodiment, the processor 410 may determine the phase of the signal received by the first antenna 440 and the phase of the signal received by the second antenna 450. The processor 410 can identify the difference between the phase of the signal received by the first antenna 440 and the phase of the signal received by the second antenna 450. The processor 410 may track changes in the phase difference to determine the movement direction of the external electronic device 300. Here, the movement direction of the external electronic device 300 may be the direction in which the external electronic device 300 is moved into (check-in) the area (e.g., house or room) where the electronic device 400 is installed, or the direction in which the external electronic device 300 is moved out of the area where the electronic device 400 is installed (check-out). The processor 410 may determine whether the external electronic device 300 is entering or exiting the designated area based on the movement direction of the external electronic device 300.

In one embodiment, the processor 410 may perform a preset operation corresponding to the movement direction of the external electronic device 300. The processor 410 may transmit information related to the movement direction of the external electronic device 300 to an external server (e.g., external server 500 in FIG. 3).

In one embodiment, upon detecting entry or exit of the external electronic device 300, the processor 410 may send a request signal to the external server 500 to change the operation mode of a second external electronic device (not shown) present in the area where the electronic device 400 is installed. For example, if the second external electronic device (e.g., motion detection sensor) is active (e.g., performing motion detection) before entry of the external electronic device 300, the processor 410 may send a request signal to the external server 500 to deactivate the second external electronic device upon entry of the external electronic device 300. Upon receiving the request signal for operation mode change, the external server 500 can control the second external electronic device in a corresponding way. As another example, if the second external electronic device (e.g., motion detection sensor) is inactive (e.g., is not performing motion detection) prior to the exit of the external electronic device 300, the processor 410 may send a request signal to the external server 500 to activate the second external electronic device upon exit of the external electronic device 300. Upon receiving the request signal for operation mode change, the external server 500 can control the second external electronic device in a corresponding way.

In one embodiment, upon detecting entry or exit of the external electronic device 300, the processor 410 may send a request signal to the external server 500 to transmit a warning message to a user terminal (not shown) corresponding to the user of the electronic device 400. The warning message may indicate that a particular user has entered the specified area. The external server 500 may transmit the warning message to the user terminal (not shown).

In one embodiment, the processor 410 can authenticate the external electronic device 300 based on authentication data transmitted by the external electronic device 300. The authentication for the external electronic device 300 may be a procedure for checking whether the external electronic device 300 is properly authorized to enter the area where the electronic device 400 is installed. The processor 410 may determine whether to open or close the door based on the authentication result for the external electronic device 300. Upon determining that the external electronic device 300 is properly authorized, the processor 410 may control the locking mechanism (not shown) included in the electronic device 400 to open the door. Upon determining that the external electronic device 300 is not properly authorized, the processor 410 may control the locking mechanism to maintain locking of the door.

Although not shown in FIG. 4, in one embodiment, the electronic device 400 may further include a speaker to output an alarm when an unauthenticated user approaches, a keypad to receive a key input (e.g. a sequence of alphanumeric characters) for authentication, and a locking mechanism to control opening and locking of the door.

Figure 5:
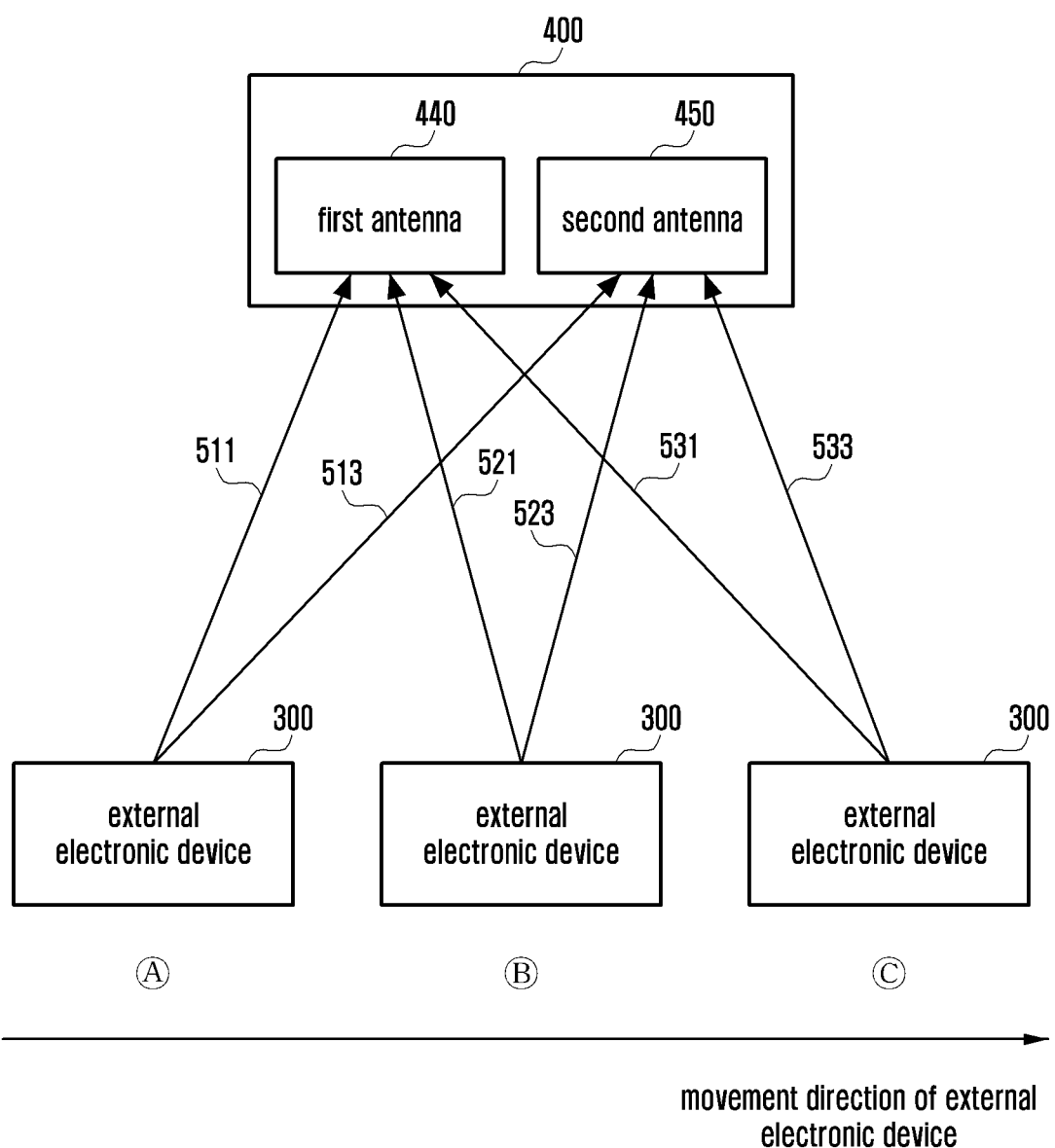
FIG. 5 is a block diagram illustrating an example in which the electronic device determines the distance to an external electronic device according to an embodiment of the disclosure.

FIG. 5 is a block diagram illustrating an example in which the electronic device determines the distance to an external electronic device according to an embodiment of the disclosure.

In FIG. 5, the electronic device 400 is continuously checking the position of the external electronic device 300 while the external electronic device 300 is moved from A to B and then is moved from B to C.

In one embodiment, the electronic device 400 can identify the position of the external electronic device by using the first antenna 440 and the second antenna 450.

In one embodiment, the signals received by the first antenna 440 and the second antenna 450 may be the same. The signal received by the first antenna 440 and the second antenna 450 may include a time stamp. The time stamp may include information on the time when the external electronic device 300 transmitted the signal.

In one embodiment, the processor 410 may identify the difference between the time at which the signal is received via the first antenna 440 and the time indicated by the time stamp, which indicates when the signal was emitted by the external electronic device 300. The processor 410 may determine the first distance between the first antenna 440 and the external electronic device 300 based on the speed of the signal (c=3*10^8 m/s) and the time difference.

In one embodiment, the processor 410 may identify the difference between the time at which the signal is received via the second antenna 450 and the time indicated by the time stamp, which indicates when the signal was emitted by the external electronic device 300. The processor 410 may determine the second distance between the second antenna 450 and the external electronic device 300 based on the speed of the signal (c=3*10^8 m/s) and the time difference.

In one embodiment, when the external electronic device 300 is at location A, the electronic device 400 may identify the first distance 511 between the first antenna 440 and the external electronic device 300 and the second distance 513 between the second antenna 450 and the external electronic device 300. Here, the first distance 511 is smaller than the second distance 513 and the difference between the first distance 511 and the second distance 513 may be negative.

In one embodiment, when the external electronic device 300 is at location B, the electronic device 400 may identify the first distance 521 between the first antenna 440 and the external electronic device 300 and the second distance 523 between the second antenna 450 and the external electronic device 300. Here, the first distance 521 is identical to the second distance 523 and the difference between the first distance 521 and the second distance 523 may be zero.

In one embodiment, when the external electronic device 300 is at location C, the electronic device 400 may identify the first distance 531 between the first antenna 440 and the external electronic device 300 and the second distance 533 between the second antenna 450 and the external electronic device 300. Here, the first distance 531 is larger than the second distance 533 and the difference between the first distance 531 and the second distance 533 may be positive.

In one embodiment, the electronic device 400 may continuously track changes in the difference between the first distance 511, 521 or 531, which is the distance between the first antenna 440 and the external electronic device 300, and the second distance 513, 523 or 533, which is the distance between the second antenna 450 and the external electronic device 300. The electronic device 400 may then determine the movement direction of the external electronic device 300 (movement from location A to location C) based on the change in the difference between the first distance 511, 521 or 531 and the second distance 513, 523 or 533. For example, when the difference between the first distance 511, 521 or 531 and the second distance 513, 523 or 533 increases (e.g., increases from negative to positive), the electronic device 400 may determine that the movement direction of the external electronic device 300 is rightward as shown in the figure (i.e. from location A to location C). Conversely, when the difference between the first distance 511, 521 or 531 and the second distance 513, 523 or 533 decreases (e.g., decreases from positive to negative), the electronic device 400 may determine that the movement direction of the external electronic device 300 is leftward in the figure (i.e. from location C to location A).

FIG. 6A is a view illustrating an example in which the electronic device determines the direction of movement of the external electronic device based on changes in the angle of the movement of the external electronic device according to an embodiment of the disclosure.

In one embodiment, the electronic device (e.g., electronic device 400 in FIG. 3) may determine the movement direction of the external electronic device 300 based on a change in the angle 615 due to the movement of the external electronic device 300.

In one embodiment, the electronic device 400 can identify the angle 615 between an imaginary line 611 connecting the external electronic device 300 and the electronic device 400 and a preset reference line (e.g., line 613 connecting the electronic device 400 and the ground surface 617). The angle 615 may be identified on the basis of the first distance between the first antenna 440 and the external electronic device 300, which in turn is determined based on the signal received by the first antenna (e.g., first antenna 440 in FIG. 4), and the second distance between the second antenna 450 and the external electronic device 300, which in turn is determined based on the signal received by the second antenna (e.g., second antenna 450 in FIG. 4). A method of identifying the angle is described below with reference to FIG. 7.

In one embodiment, when the external electronic device 300 is moved in the direction 621 to enter the area where the electronic device 400 is installed (check-in), the value of the angle 615 may gradually increase (e.g., increase from −80 degrees to +80 degrees). When the external electronic device 300 is moved in the direction 623 leaving the area where the electronic device 400 is installed (check-out), the value of the angle 615 may gradually decrease (e.g., decrease from +80 degrees to −80 degrees). The electronic device 400 may track the change in the angle and determine the movement direction of the external electronic device 300 based on the change in the angle. Based on the change in the angle 615, the electronic device 400 may determine whether the external electronic device 300 is entering (check-in) or is leaving (check-out) the area where the electronic device 400 is installed.

Figure 6B:
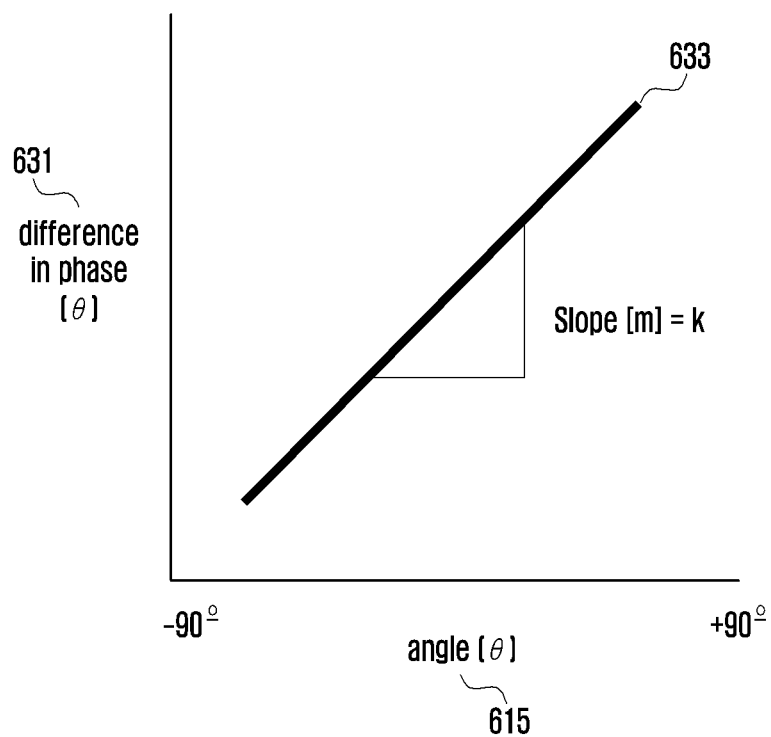
FIG. 6B is a graph illustrating an example in which the electronic device determines the direction of movement of the external electronic device based on the phase difference between signals received by the first antenna and the second antenna according to an embodiment of the disclosure.

FIG. 6B is a graph illustrating an example in which the electronic device determines the direction of movement of the external electronic device based on the phase difference between signals received by the first antenna and the second antenna according to an embodiment of the disclosure.

In one embodiment, the first antenna (e.g., first antenna 440 in FIG. 4) and the second antenna (e.g., second antenna 450 in FIG. 4) may each receive a signal output by an external electronic device (e.g., external electronic device 300 in FIG. 3). The first antenna 440 and the second antenna 450 may receive signals having different phases depending on the position of the external electronic device 300.

FIG. 6B shows that the angle corresponding to the position of the external electronic device 300 (e.g., angle 615 in FIG. 6A) and the phase difference 631 between the signals received by the first antenna 440 and the second antenna 450 are changing according to a certain relationship 633. In FIG. 6B, it can be seen that the phase difference increases in proportion to the change of the angle 615. As the phase difference 631 increases, the angle 615 may increase. As the phase difference 631 decreases, the angle 615 may decrease. The relationship shown in FIG. 6B can indicate that the external electronic device 300 moves in a direction toward the electronic device 400 as the phase difference increases. Conversely, it may also indicate that the external electronic device 300 moves in a direction away from the electronic device 400 as the phase difference decreases.

In one embodiment, the electronic device (e.g., electronic device 400 in FIG. 3) may identify the phases of the signals received by the first antenna 440 and the second antenna 450, and may identify the difference 631 between the phase of the signal received by the first antenna 440 and the phase of the signal received by the second antenna 450. The electronic device 400 may track changes in the phase difference and determine the movement direction of the external electronic device 300 based on the change in the phase difference 631.

Figure 7:
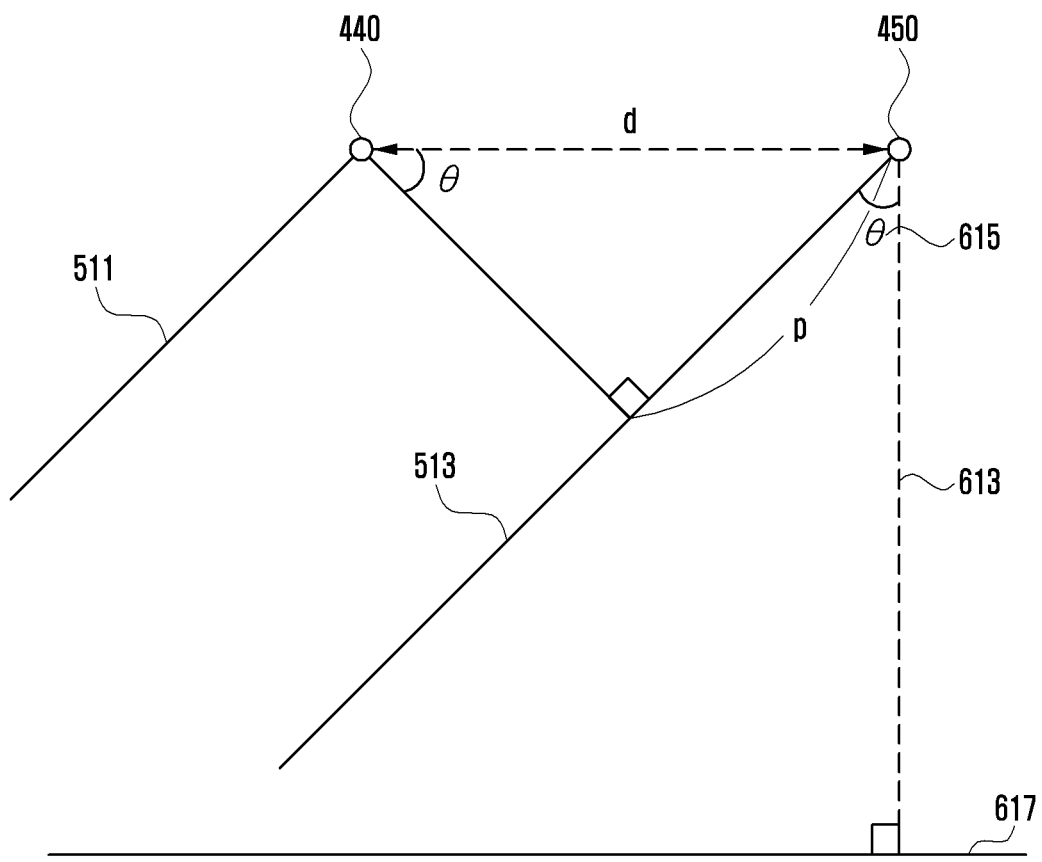
FIG. 7 is a diagram illustrating an example in which the electronic device determines the angle based on the difference of distances to the external electronic device from two antennas according to an embodiment of the disclosure.

FIG. 7 is a diagram illustrating an example in which the electronic device determines the angle based on the difference of distances to the external electronic device from two antennas according to an embodiment of the disclosure.

FIG. 7 relates to determining the angle 615 shown in FIG. 6A, and depicts, when the external electronic device 300 is located in location A as shown in FIG. 5, a scheme for determining the angle 615 between the imaginary line 613 connecting the ground surface 617 and the electronic device 400 and the imaginary line between the electronic device 400 and the external electronic device 300.

In one embodiment, the external electronic device 300 may emit a signal for positioning of the external electronic device 300. The electronic device 400 may receive the signal emitted by the external electronic device 300 through the first antenna 440 and the second antenna 450. The electronic device 400 may determine the first distance 511 between the first antenna 440 and the external electronic device 300 and the second distance 513 between the second antenna 450 and the external electronic device 300.

In one embodiment, the electronic device 400 may calculate the difference (p) between the first distance 511 and the second distance 513. The electronic device 400 may determine the angle 615 based on the relationship between the difference (p) and the distance (d) between the first antenna 440 and the second antenna 450. The angle 615 can be calculated using Equation 1 below.

$$\sin(\theta) = \frac{p}{d}, \theta = \sin^{-1}\frac{p}{d} \qquad [\text{Equation 1}]$$

(θ: angle 615, p: difference between first distance 511 and second distance 513, d: distance between first antenna 440 and second antenna 450)

In one embodiment, when the electronic device 400 uses UWB communication with a frequency band of 6.5 GHz, the distance (d) between the first antenna 450 and the second antenna 450 may be about 23 to 24 mm.

In one embodiment, the electronic device 400 may determine the angle 615 based on the difference between the first distance 511 and the second distance 513. The electronic device 400 may determine the movement direction of the external electronic device 300 based on the change in the angle 615 and may perform various operations corresponding to the determined movement direction.

FIGS. 8A to 8D are a diagram and graphs illustrating the radiation patterns of signals emitted by the antennas of the electronic device in the x-y plane, the y-z plane, and the x-z plane according to an embodiment of the disclosure.

Figure 8A:
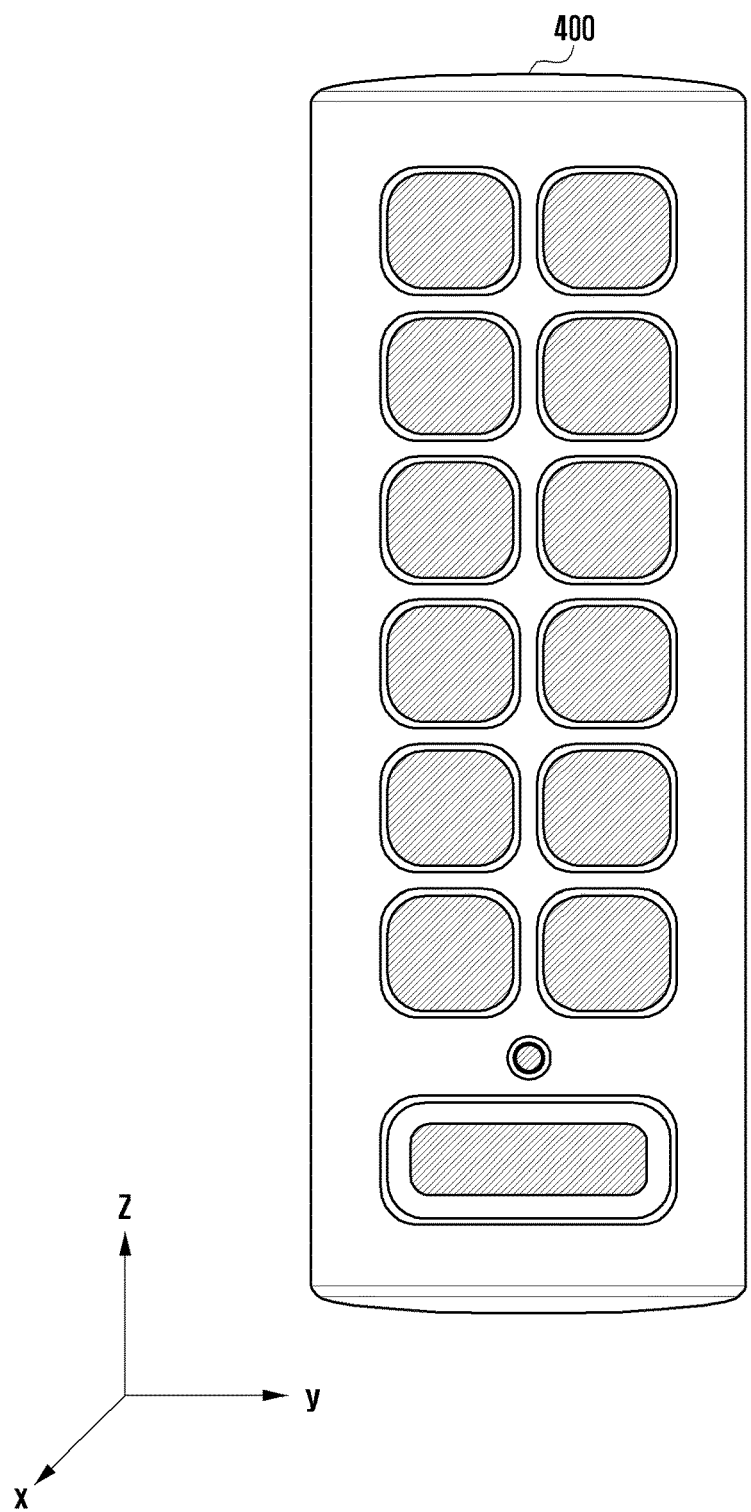
FIGS. 8A to 8D are a diagram and graphs illustrating radiation patterns of signals emitted by the antennas of the electronic device according to an embodiment of the disclosure.

With reference to FIG. 8A, the x-y plane may indicate a plane parallel to the ground surface on which the electronic device (e.g., electronic device 400 in FIG. 3) is installed. The y-z plane may indicate a plane parallel to the surface on which the keypad of the electronic device 400. The x-z plane may indicate a plane perpendicular to the x-y plane and the y-z plane.

In one embodiment, the first antenna (e.g., first antenna 440 in FIG. 4) and the second antenna (e.g., second antenna 450 in FIG. 4) may be arranged to have the same height from the ground surface. For example, the board on which the first antenna 440 and the second antenna 450 are mounted may be disposed in parallel with the x-y plane.

Figure 8B:
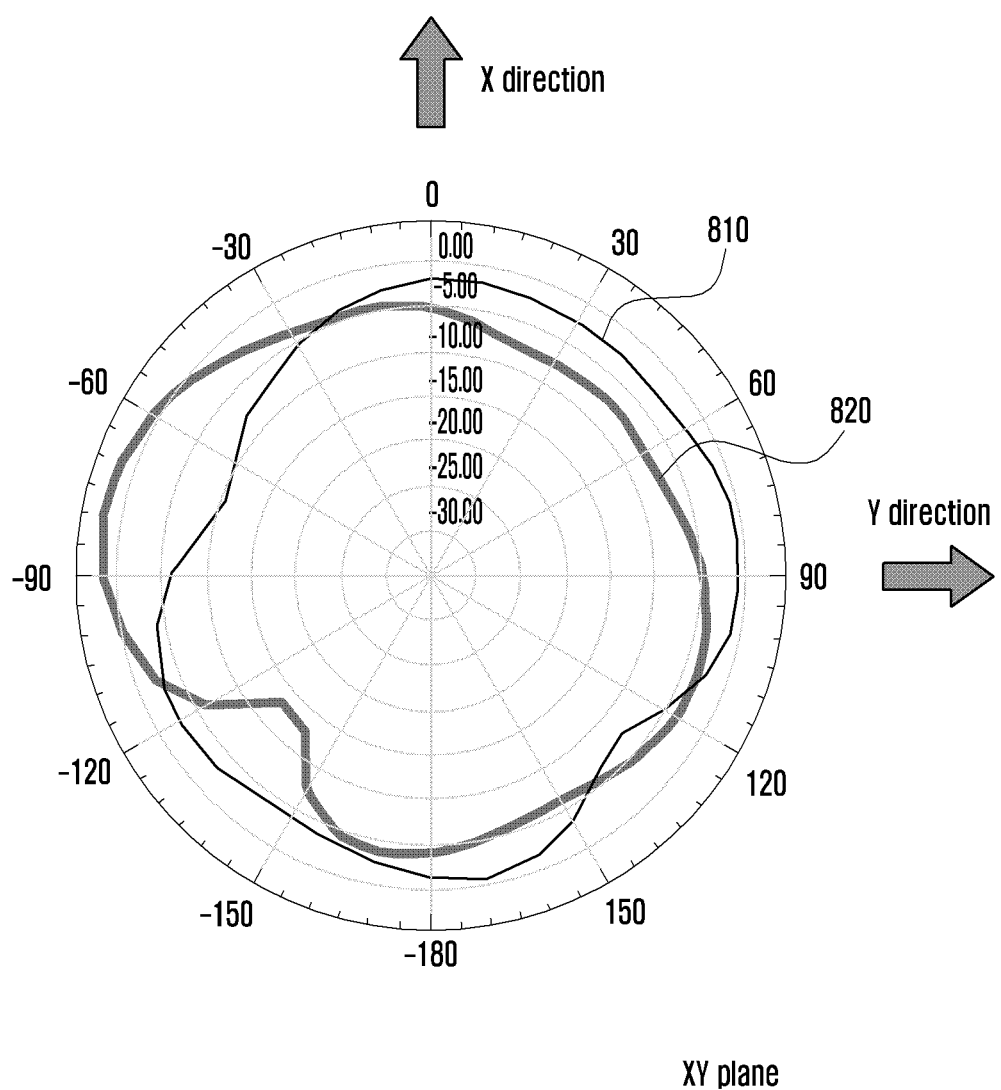

In FIG. 8B, the radiation pattern 810 emitted by the first antenna (e.g., first antenna 440 in FIG. 4) of the electronic device (e.g., electronic device 400 in FIG. 3) and the radiation pattern 820 emitted by the second antenna (e.g., second antenna 450 in FIG. 4) are shown on the x-y plane.

Figure 8C:
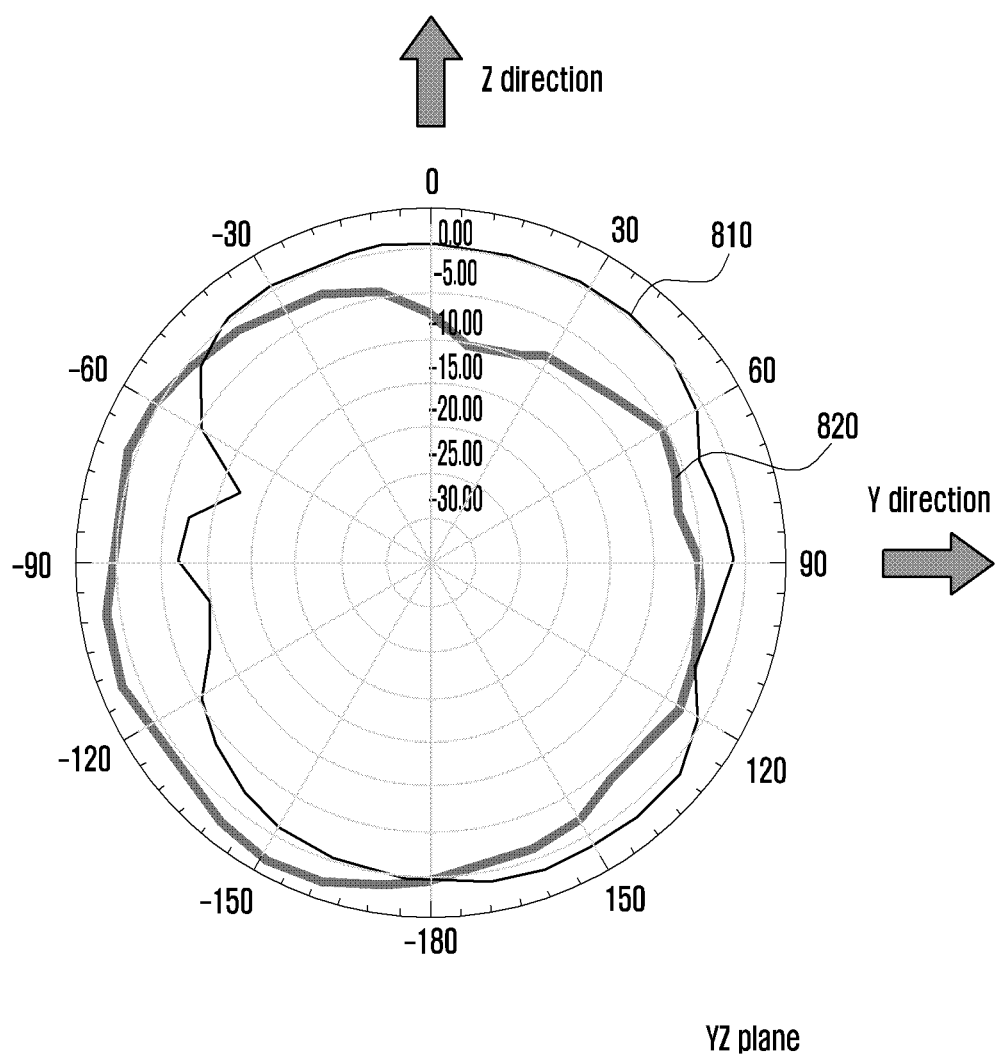

In FIG. 8C, the radiation pattern 810 emitted by the first antenna 440 of the electronic device 400 and the radiation pattern 820 emitted by the second antenna 450 are shown on the y-z plane.

Figure 8D:
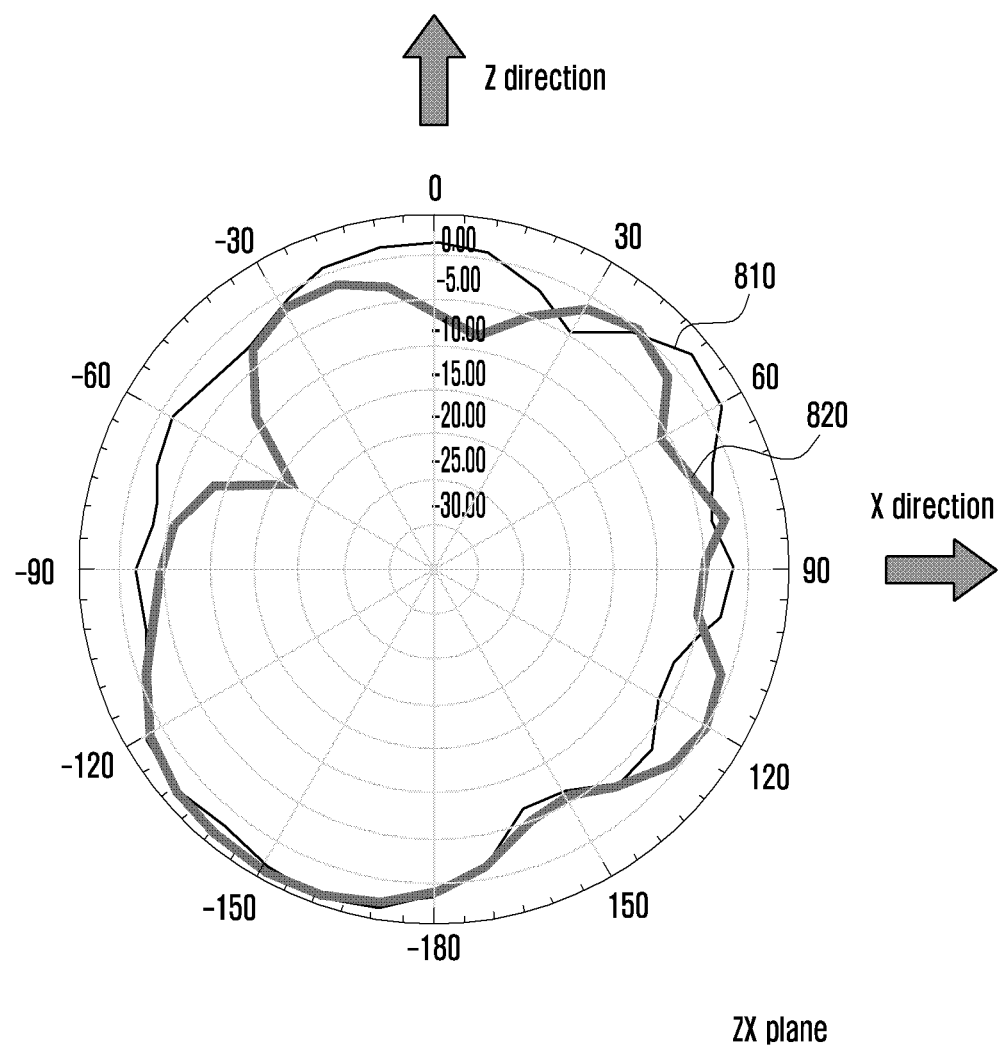

In FIG. 8D, the radiation pattern 810 emitted by the first antenna 440 of the electronic device 400 and the radiation pattern 820 emitted by the second antenna 450 are shown on the x-z plane.

In one embodiment, the radiation pattern 810 emitted by the first antenna 440 and the radiation pattern 820 emitted by the second antenna 450 may indicate a radiation pattern having a specific directionality (e.g., forming a certain angle with the ground surface, or parallel to the ground surface).

Figure 9:
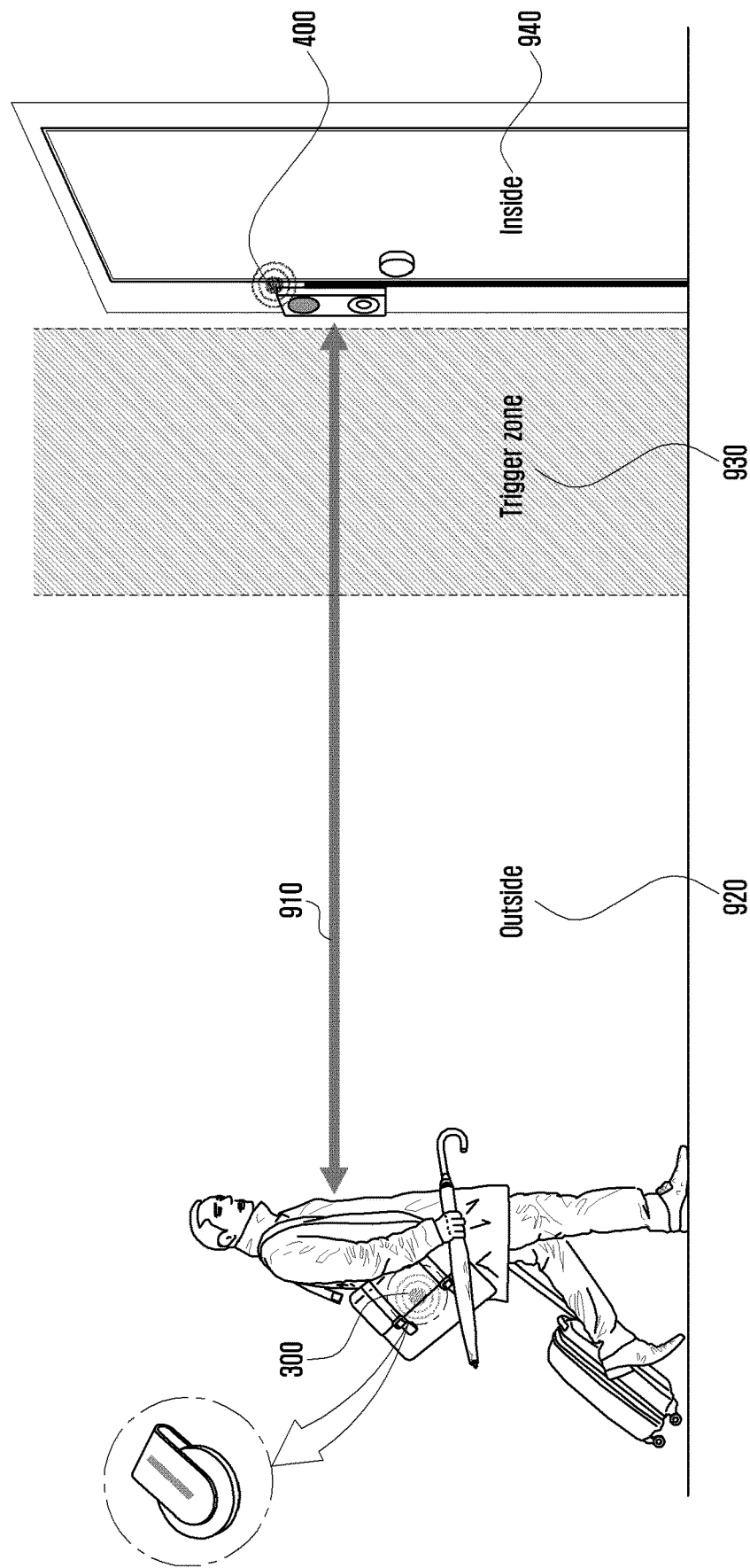
FIG. 9 is a view illustrating an example in which the electronic device determines the direction of movement of the external electronic device based on changes in distance and angle of the movement of the external electronic device according to an embodiment of the disclosure.

FIG. 9 is a view illustrating an example in which the electronic device determines the direction of movement of the external electronic device based on changes in distance and angle of the movement of the external electronic device according to an embodiment of the disclosure.

In one embodiment, the electronic device 400 may determine the movement direction of the external electronic device 300 not only based on the difference between the first distance (e.g., first distance 511 in FIG. 5) and the second distance (e.g., second distance 513 in FIG. 5) or the angle (e.g., angle 615 in FIG. 6A) but also based on the change in the third distance 910 between the external electronic device 300 and the electronic device 400.

When the user carrying the external electronic device 300 is moving from the outside 920 toward the inside 940 (inside the house), the distance between the external electronic device 300 and the electronic device 400 can be continuously reduced. The electronic device 400 may track the difference between the first distance 511 and the second distance 513 and the change in the third distance 910, and may determine the movement direction of the external electronic device 300 based on the change in the third distance. For example, the electronic device 400 may determine that the external electronic device 300 is moving in the direction toward the house after confirming that the third distance is decreasing. As another example, the electronic device 400 may determine that the external electronic device 300 is moving away from the house after confirming that the third distance is increasing.

In one embodiment, the electronic device 400 may perform a preset operation corresponding to the movement direction of the external electronic device 300. For example, when the external electronic device 300 moves to the inside 940, the electronic device 400 may transmit a signal indicating that the external electronic device 300 has entered the house to the external server (e.g., external server 500 in FIG. 3). As another example, when the external electronic device 300 moves to the inside 940, the electronic device 400 may transmit a request signal to the external server 500 to change the operation mode of a second external electronic device (not shown) disposed in the inside 940. As another example, when the external electronic device 300 moves toward the inside 940, the electronic device 400 may authenticate the external electronic device 300 and determine whether to open or close the door based on the authentication result.

In one embodiment, the electronic device 400 may detect that the external electronic device 300 is present in the first area 930 (also referred to as a trigger zone). The electronic device 400 may perform a preset operation described above after confirming that the external electronic device 300 is present in the first area 930. For example, the electronic device 400 may perform an authentication operation after detecting that the external electronic device 300 is present in the first area 930.

In one embodiment, the electronic device 400 may determine the movement direction of the external electronic device 300 based on the change in the angle (e.g., angle 615 in FIG. 6A) of the movement of the external electronic device 300 as shown in FIGS. 5 and 6A and the change in the distance 910 between the electronic device 400 and the external electronic device 300 as shown in FIG. 9.

Figure 10:
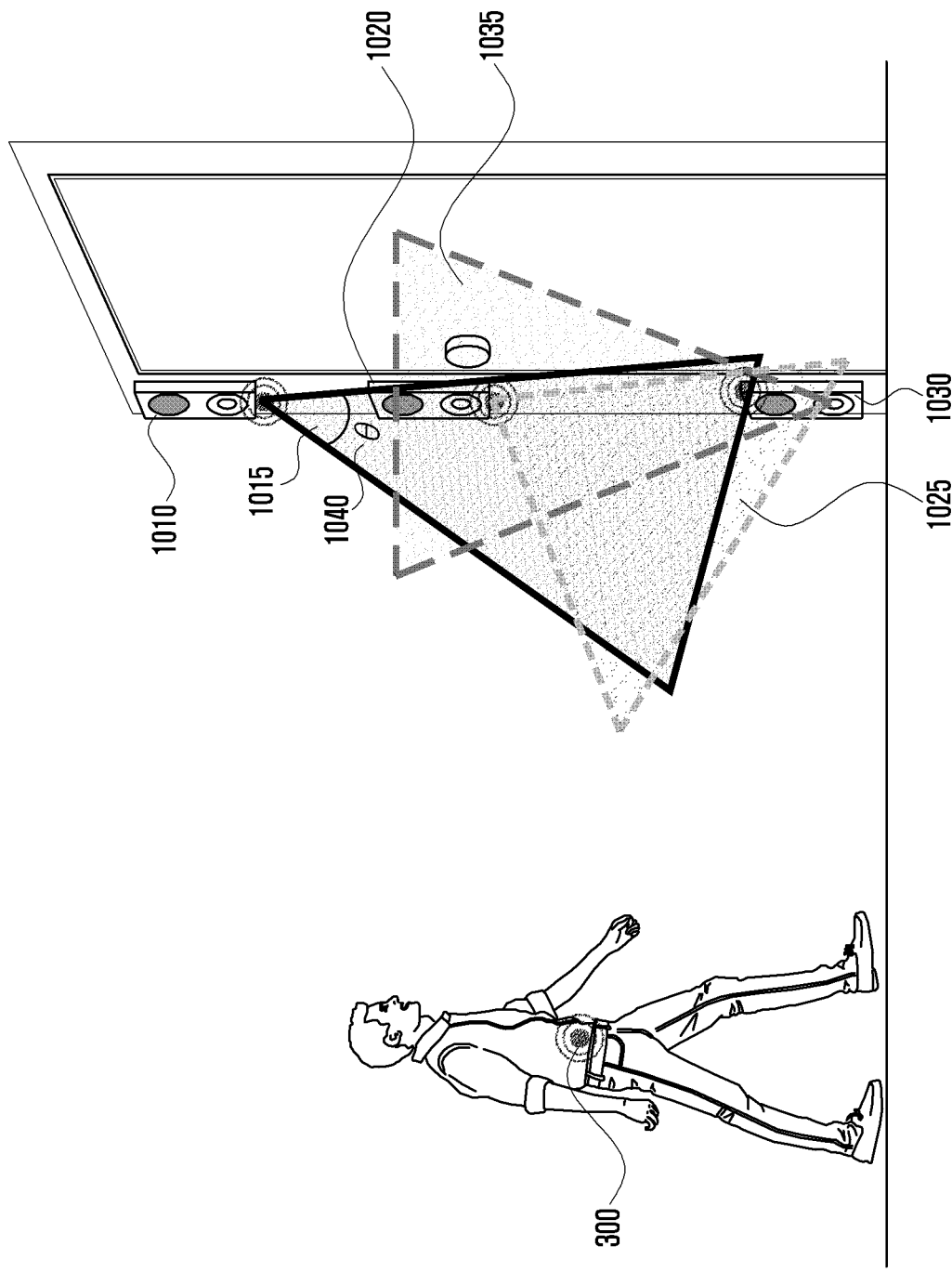
FIG. 10 is a view illustrating an example in which the electronic device adjusts the area for initiating a preset operation according to an embodiment of the disclosure.

FIG. 10 is a view illustrating an example in which the electronic device adjusts a second area for sensing an external electronic device according to an embodiment of the disclosure.

In one embodiment, the electronic device 400 may detect the external electronic device 300 moving in the second area. The electronic device 400 may be unable to detect the external electronic device 300 outside the second area, and may be able to detect the external electronic device 300 moving in the second area.

In one embodiment, the electronic device 400 may be installed adjacent to the door. The electronic device 400 can configure the second area differently depending on the installed height.

For example, in FIG. 10, the electronic device 1010 installed at a first height can configure a second area 1015 corresponding to the first height. The electronic device 1010 may detect the external electronic device 300 moving in the second area 1015.

As another example, the electronic device 1020 installed at a second height can configure a second area 1025 corresponding to the second height. The electronic device 1020 may detect the external electronic device 300 moving in the second area 1025.

As yet another example, the electronic device 1030 installed at a third height can configure a second area 1035 corresponding to the third height. The electronic device 1030 may detect the external electronic device 300 moving in the second area 1035.

In one embodiment, the electronic device 400 may adjust the second area 1015, 1025 or 1035 depending on the position at which the electronic device 400 is installed. When the electronic device 400 is installed at a height of 180 cm for example, the angle 1040 of the second area (the angle having the location of the electronic device 400 as the vertex) for sensing the external electronic device 300 can be adjusted within a range of −30 degrees to 10 degrees, with respect to an imaginary vertical line from the electronic device 400 downward towards the ground, such as line 613 shown in FIG. 6A. When the electronic device 400 is installed at a height of 150 cm for example, the angle 1040 of the second area for sensing the external electronic device 300 can be adjusted within a range of −60 degrees to 10 degrees. When the electronic device 400 is installed at a height of 0 cm for example, the angle 1040 of the second area for sensing the external electronic device 300 can be adjusted within a range of −30 degrees to 30 degrees, with respect to an imaginary vertical line from the electronic device 400 upward towards the sky.

In one embodiment, the electronic device 400 can determine the height where the electronic device 400 is installed in various ways. The electronic device 400 can determine the height by using a position measurement sensor (e.g., GPS sensor or altitude measurement sensor). In another example, the user may place the external electronic device 300 on the ground and the electronic device 400 may determine the distance between the external electronic device 300 and the electronic device 400. This way, the electronic device 400 may determine the distance between the external electronic device 300 and the electronic device 400 as the height of the electronic device 400.

In one embodiment, the electronic device 400 can determine the height at which the electronic device 400 is installed and adjust the second area for sensing the external electronic device 300 in accordance with the installed height. The electronic device 400 can determine the movement direction of the external electronic device 300 within the second area and can perform a preset operation corresponding to the movement direction.

According to an embodiment of the disclosure, the electronic device may include: a first antenna and a second antenna to receive a signal output by an external electronic device; a communication circuit configured to control the first antenna and the second antenna; and a processor, wherein the processor may be configured to: receive the signal through the first antenna and the second antenna; measure a first distance between the first antenna and the external electronic device using the signal received by the first antenna; measure a second distance between the second antenna and the external electronic device using the signal received by the second antenna; determine a movement direction of the external electronic device based on a change in a difference between the first distance and the second distance; and perform a preset operation corresponding to the movement direction of the external electronic device.

In an embodiment, the processor of the electronic device may be configured to identify, based on the difference between the first distance and the second distance, an angle between an imaginary line connecting the external electronic device and the electronic device and a preset reference line, and determine the movement direction of the external electronic device based on a change in the angle.

In an embodiment, the processor of the electronic device may be configured to determine whether the external electronic device enters or leaves an area corresponding to where the electronic device is installed based on the change in the angle or the movement direction of the external electronic device.

In an embodiment, the communication circuit of the electronic device may be configured to exchange data with an external server that controls other external electronic devices arranged in the area corresponding to where the electronic device is installed, and the processor may be configured to transmit information indicating whether the external electronic device enters or leaves the area to the external server.

In an embodiment, the processor of the electronic device may be configured to determine whether to change an operation mode of the other external electronic devices based on the movement direction of the external electronic device, and transmit information indicating an operation mode change to the external server.

In an embodiment, the processor of the electronic device may be configured to: determine the first distance based on a difference between a first time at which the signal is received via the first antenna and a second time at which the signal was emitted by the external electronic device as indicated by a time stamp included in the signal; and determine the second distance based on a difference between a third time at which the signal is received via the second antenna and the second time at which the signal was emitted by the external electronic device as indicated by the time stamp included in the signal.

In an embodiment, the processor of the electronic device may be configured to: determine a first phase of the signal received via the first antenna and a second phase of the signal received via the second antenna; and determine the movement direction of the external electronic device based on a change in a difference between the first phase and the second phase.

In an embodiment, the processor of the electronic device may be configured to: identify a distance between the external electronic device and the electronic device; and determine the movement direction of the external electronic device based on a change in the distance between the external electronic device and the electronic device and a change in the angle.

In an embodiment, the processor of the electronic device may be configured to: detect that the external electronic device has entered a first area; and perform the preset operation in response to detecting that the external electronic device has entered the first area.

In an embodiment, the processor of the electronic device may be configured to: identify a distance between the external electronic device and a ground surface; and adjust a second area for detecting the external electronic device based on the distance between the external electronic device and the ground surface.

In an embodiment, the processor of the electronic device may be configured to: determine that the external electronic device is located at a designated location; measure a distance between the external electronic device and the electronic device; and determine the distance between the external electronic device and the electronic device as the distance between the electronic device and the ground surface.

In an embodiment, the signal may be an ultra-wideband (UWB) signal.

Figure 11:
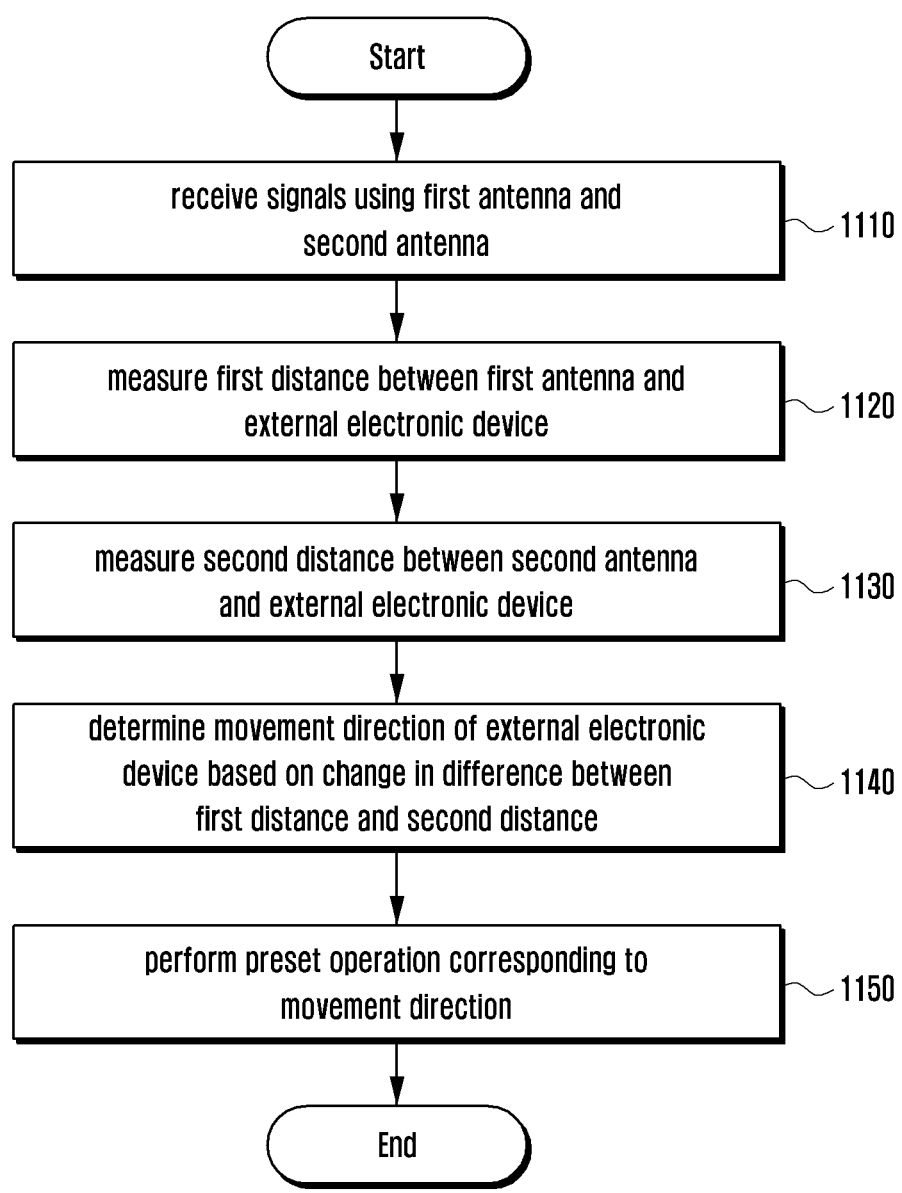
FIG. 11 is a flowchart illustrating an operation method of the electronic device according to an embodiment of the disclosure.

FIG. 11 is a flowchart illustrating an operation method of the electronic device according to an embodiment of the disclosure.

With reference to FIG. 11, in the operation method of the electronic device according to this embodiment, at operation 1110, the electronic device 400 may receive signals transmitted by an external electronic device (e.g., external electronic device 300 in FIG. 3) by using a first antenna (e.g., first antenna 440 in FIG. 4) and a second antenna (e.g., second antenna 450 in FIG. 4).

In one embodiment, the external electronic device 300 may emit a signal for position measurement thereof through UWB communication using a frequency band of several GHz. The signal received by the first antenna 440 and the second antenna 450 may include a time stamp. The time stamp may include information on the time when the external electronic device 300 transmitted the signal.

In one embodiment, at operation 1120, the electronic device 400 may measure the first distance between the first antenna 440 and the external electronic device 300.

In one embodiment, the electronic device 400 may identify the difference between the time at which the signal is received via the first antenna 440 and the time indicated by the time stamp, which indicates when the signal was emitted by the external electronic device 300. The electronic device 400 may determine the first distance between the first antenna 440 and the external electronic device 300 based on the speed of the signal (c=3*10-8 m/s) and the time difference.

In one embodiment, at operation 1130, the electronic device 400 may determine the second distance between the second antenna 450 and the external electronic device 300.

In one embodiment, the electronic device 400 may identify the difference between the time at which the signal is received via the second antenna 450 and the time indicated by the time stamp, which indicates when the signal was emitted by the external electronic device 300. The electronic device 400 may determine the second distance between the second antenna 450 and the external electronic device 300 based on the speed of the signal (c=3*10-8 m/s) and the time difference.

In one embodiment, at operation 1140, the electronic device 400 may determine the movement direction of the external electronic device based on a change in the difference between the first distance and the second distance.

In one embodiment, the movement direction of the external electronic device 300 may be a direction in which the external electronic device 300 enters the area (e.g., house) where the electronic device 400 is installed (check-in), or a direction in which the external electronic device 300 leaves the area where the electronic device 400 is installed (check-out). The electronic device 400 may determine whether the external electronic device 300 is entering or is leaving the designated area based on a change in the difference between the first distance and the second distance.

In one embodiment, at operation 1150, the electronic device 400 may perform a preset operation corresponding to the movement direction of the external electronic device 300.

In one embodiment, upon confirming that the external electronic device 300 has entered or has left the designated area, the electronic device 400 can transmit a request signal to the external server 500 to change the operation mode of a second external electronic device (not shown) present in the area where the electronic device 400 is installed.

In one embodiment, upon confirming that the external electronic device 300 has entered or has left the designated area, the electronic device 400 may send a request signal to the external server 500 to transmit a warning message to a user terminal (not shown) corresponding to the user of the electronic device 400.

In one embodiment, the electronic device 400 may authenticate the external electronic device 300 based on authentication data sent by the external electronic device 300.

Figure 12:
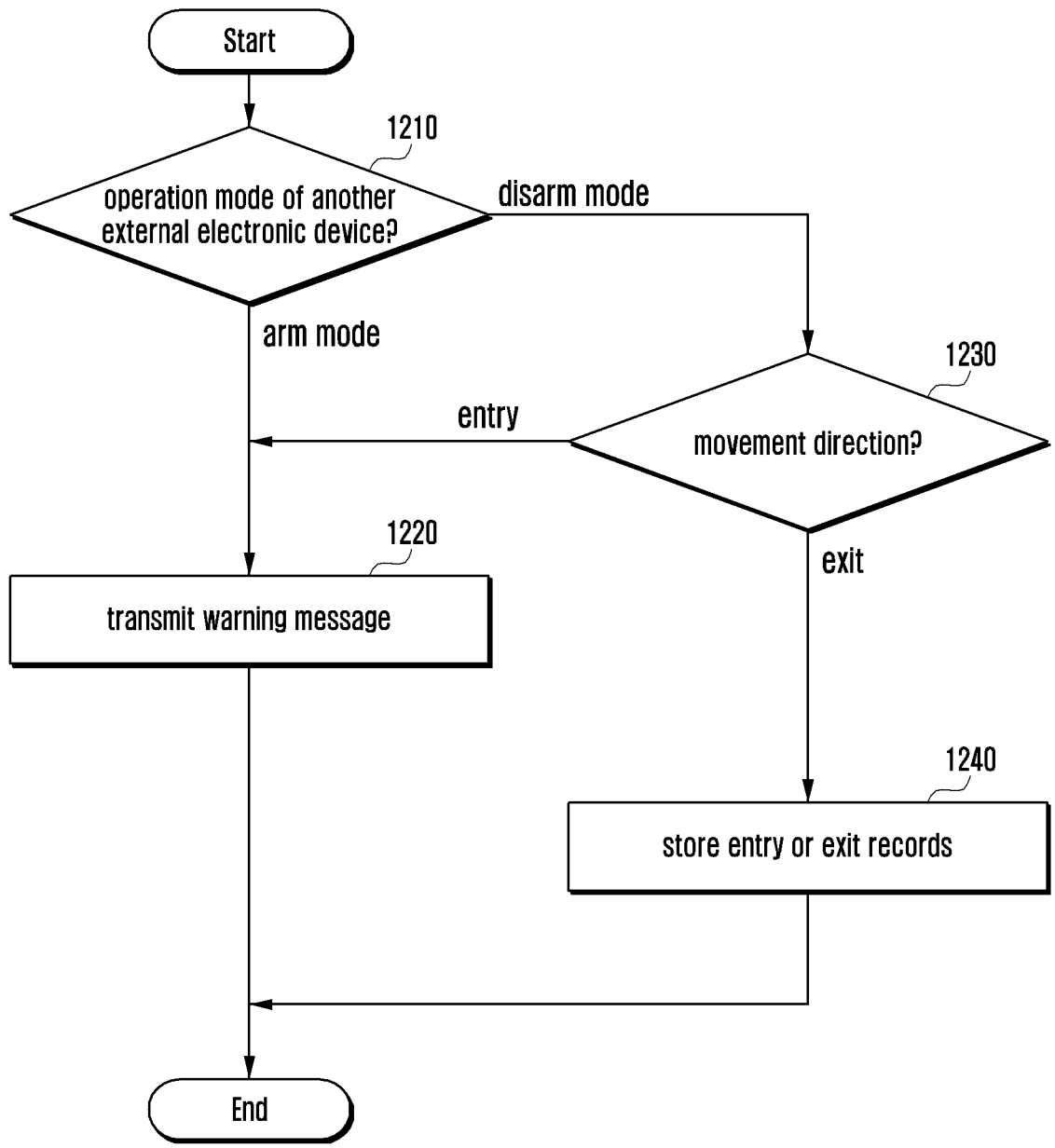
FIG. 12 is a flowchart for performing a preset operation in the operation method of the electronic device according to an embodiment of the disclosure.

FIG. 12 is a flowchart for performing a preset operation in the operation method of the electronic device according to an embodiment of the disclosure. The operations shown in FIG. 12 may carried out after the operations shown in FIG. 11.

With reference to FIG. 12, in one embodiment, at operation 1210, the external server (e.g., external server 500 in FIG. 3) can check the operation mode of a second external electronic device.

In one embodiment, the operation mode of the second external electronic device may include the arm mode in which motion detection is activated within the area, and the disarm mode in which motion detection is not activated within the area. Upon receiving the entry or exit information from the electronic device (e.g., electronic device 400 in FIG. 3), the external server 500 may check the operation mode of the second external electronic device.

In one embodiment, if the operation mode of the second external electronic device is the arm mode, at operation 1220, the external server 500 may transmit a warning message to a user terminal (not shown). The warning message may indicate entry of a particular user.

In one embodiment, if the operation mode of the second external electronic device is the disarm mode, at operation 1230, the external server 500 can check the movement direction of the external electronic device 300.

In one embodiment, upon detecting entry of the external electronic device 300, at operation 1220, the external server 500 may transmit a warning message to the user terminal (not shown).

In one embodiment, upon detecting an exit of the external electronic device 300, at operation 1240, the external server 500 may store entry or exit records of the external electronic device 300. The stored entry or exit records may be transmitted to the user terminal (not shown) upon request.

In one embodiment, the electronic device 400 may determine the movement direction of the external electronic device 300. For example, the electronic device 400 may determine whether the external electronic device 300 has entered or has exited the area where the electronic device 400 is installed (e.g. a room or a house). The external server 500 can determine whether to send a warning message based on if the external electronic device 300 entered or exited the area. The external server 500 may transmit a warning message to the user terminal upon detecting entry of the external electronic device 300, and may not transmit a warning message to the user terminal upon detecting exit of the external electronic device 300.

According to an embodiment of the disclosure, the operation method for the electronic device may include: receiving a signal output by an external electronic device by using a first antenna and a second antenna; determining a first distance between the first antenna and the external electronic device based on the signal received by the first antenna; determining a second distance between the second antenna and the external electronic device based on the signal received by the second antenna; determining a movement direction of the external electronic device based on a change in a difference between the first distance and the second distance; and performing a preset operation corresponding to the movement direction of the external electronic device.

In an embodiment, determining the movement direction of the external electronic device in the operation method may include: measuring, based on the difference between the first distance and the second distance, an angle between an imaginary line connecting the external electronic device and the electronic device and a preset reference line; and determining the movement direction of the external electronic device based on a change in the angle.

In an embodiment, performing the preset operation in the operation method may include: transmitting information indicating entry or exit to an external server.

In an embodiment, performing the preset operation in the operation method may include: determining whether to change an operation mode of second external electronic devices based on a change in the angle; and transmitting information indicating whether to change the operation mode to the external server.

In an embodiment, determining the movement direction of the external electronic device in the operation method may include: determining the first distance based on a difference between a first time at which the signal is received via the first antenna and a second time at which the signal was emitted by the external electronic device as indicated by a time stamp included in the signal; and determining the second distance based on a difference between a third time at which the signal is received via the second antenna and the second time at which the signal was emitted by the external electronic device as indicated by the time stamp included in the signal.

In an embodiment, the operation method may further include: identifying a distance between the external electronic device and the electronic device; and determining the movement direction of the external electronic device based on a change in the distance between the external electronic device and the electronic device and a change in the angle.

In an embodiment, the operation method may further include: detecting that the external electronic device has entered a designated area; and determining the movement direction of the external electronic device in response to detecting that the external electronic device has entered the designated area.

In an embodiment, the operation method may further include: determining that the external electronic device is located in a designated area; measuring a distance between the external electronic device and the electronic device; determining the distance between the external electronic device and the electronic device as a distance between the external electronic device and a ground surface; and adjusting the designated area based on the distance between the external electronic device and the ground surface.

The electronic device and the operation method thereof according to certain embodiments of the disclosure may be applied to various electronic appliances installable in various places, such as IoT sensors, door locks, door bells, smart home devices, and vehicle keys.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

According to an embodiment of the disclosure, in the operation method of the electronic device, at least two antennas are used to identify changes in the distance or angle between the external electronic device and the electronic device, and it is possible to determine whether the external electronic device enters or exits a designated space based on the change in the distance or angle.

According to an embodiment of the disclosure, in the operation method of the electronic device, as it is possible to determine whether the external electronic device enters or exits a designated space, and operations of electronic devices may be controlled based on whether the user is present in the designated space.

According to an embodiment of the disclosure, in the operation method of the electronic device, as the location information of the external electronic device carried by the user is obtained using precise communication (e.g., ultra-wideband), security for authentication related to user access can be improved.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B,"

"at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
   a first antenna and a second antenna to receive a signal output by an external electronic device;
   a communication circuit configured to control the first antenna and the second antenna; and
   a processor, wherein the processor is configured to:
      receive the signal through the first antenna and the second antenna;
      measure a first distance between the first antenna and the external electronic device using the signal received by the first antenna;
      measure a second distance between the second antenna and the external electronic device using the signal received by the second antenna;
      determine a movement direction of the external electronic device based on a change in a difference between the first distance and the second distance; and
      perform a preset operation corresponding to the movement direction of the external electronic device.

2. The electronic device of claim 1, wherein the processor is further configured to:
   identify, based on the difference between the first distance and the second distance, an angle between an imaginary line connecting the external electronic device and the electronic device and a preset reference line; and
   determine the movement direction of the external electronic device based on a change in the angle.

3. The electronic device of claim 2, wherein the processor is further configured to:
   identify a distance between the external electronic device and the electronic device; and
   determine the movement direction of the external electronic device based on a change in the distance between the external electronic device and the electronic device and a change in the angle.

4. The electronic device of claim 2, wherein the processor is further configured to determine whether the external electronic device enters or exits an area corresponding to where the electronic device is installed based on the change in the angle or the movement direction of the external electronic device.

5. The electronic device of claim 4, wherein the communication circuit is further configured to exchange data with an external server that controls other external electronic devices arranged in the area corresponding to where the electronic device is installed, and wherein the processor is further configured to transmit information indicating entry or exit of the external electronic device to the external server.

6. The electronic device of claim 5, wherein the processor is further configured to:
   determine whether to change an operation mode of the other external electronic devices based on the movement direction of the external electronic device; and
   transmit information indicating a change of the operation mode to the external server.

7. The electronic device of claim 1, wherein the processor is further configured to:
   determine the first distance based on a difference between a first time at which the signal is received via the first antenna and a second time at which the signal was emitted by the external electronic device as indicated by a time stamp included in the signal; and
   determine the second distance based on a difference between a third time at which the signal is received via the second antenna and the second time at which the signal was emitted by the external electronic device as indicated by the time stamp included in the signal.

8. The electronic device of claim 1, wherein the processor is further configured to:
   determine a first phase of the signal received via the first antenna and a second phase of the signal received via the second antenna; and
   determine the movement direction of the external electronic device based on a change in a difference between the first phase and the second phase.

9. The electronic device of claim 1, wherein the processor is further configured to:
   detect that the external electronic device has entered a first area; and
   perform the preset operation in response to detecting that the external electronic device has entered the first area.

10. The electronic device of claim 1, wherein the processor is further configured to:
    identify a distance between the external electronic device and a ground surface; and
    adjust a second area for detecting the external electronic device based on the distance between the external electronic device and the ground surface.

11. The electronic device of claim 10, wherein the processor is further configured to:
    determine that the external electronic device is located at a designated location;
    measure a distance between the external electronic device and the electronic device; and
    determine the distance between the external electronic device and the electronic device as the distance between the electronic device and the ground surface.

12. The electronic device of claim 1, wherein the signal is an ultra-wideband (UWB) signal.

13. A method of operation for an electronic device, the method comprising:
    receiving a signal output by an external electronic device via a first antenna and a second antenna;
    determining a first distance between the first antenna and the external electronic device based on the signal received via the first antenna;
    determining a second distance between the second antenna and the external electronic device based on the signal received via the second antenna;
    determining a movement direction of the external electronic device based on a change in a difference between the first distance and the second distance; and
    performing a preset operation corresponding to the movement direction of the external electronic device.

14. The method of claim 13, wherein determining the movement direction of the external electronic device further comprises:
    measuring, based on the difference between the first distance and the second distance, an angle between an imaginary line connecting the external electronic device and the electronic device and a preset reference line; and
    determining the movement direction of the external electronic device based on a change in the angle.

15. The method of claim 14, further comprising:
    identifying a distance between the external electronic device and the electronic device; and
    determining the movement direction of the external electronic device based on a change in the distance between the external electronic device and the electronic device and a change in the angle.

16. The method of claim 14, wherein performing the preset operation further comprises:
    transmitting information indicating entry or exit of the external electronic device to an external server.

17. The method of claim 14, wherein performing the preset operation further comprises:
    determining whether to change an operation mode of another external electronic device based on a change in the angle; and
    transmitting information indicating whether to change the operation mode to an external server.

18. The method of claim 13, wherein determining the movement direction of the external electronic device further comprises:
    determining the first distance based on a difference between a first time at which the signal is received via the first antenna and a second time at which the signal was emitted by the external electronic device as indicated by a time stamp included in the signal; and
    determining the second distance based on a difference between a third time at which the signal is received via the second antenna and the second time at which the signal was emitted by the external electronic device as indicated by the time stamp included in the signal.

19. The method of claim 13, further comprising:
    detecting that the external electronic device has entered a designated area; and determining the movement direction of the external electronic device in response to detecting that the external electronic device has entered the designated area.

20. The method of claim 13, further comprising:

determining that the external electronic device is located in a designated area;

measuring a distance between the external electronic device and the electronic device;

determining the distance between the external electronic device and the electronic device as a distance between the external electronic device and a ground surface; and adjusting the designated area based on the distance between the external electronic device and the ground surface.

* * * * *